(12) United States Patent
Heuer et al.

(10) Patent No.: US 10,472,516 B2
(45) Date of Patent: Nov. 12, 2019

(54) IMPROVING THE FLOWABILITY OF THERMOCONDUCTIVE POLYCARBONATE COMPOSITIONS

(71) Applicant: Covestro Deutschland AG, Leverkusen (DE)

(72) Inventors: Helmut Werner Heuer, Leverkusen (DE); Rolf Wehrmann, Krefeld (DE); Anke Boumans, Goch (DE); Michael Erkelenz, Duisburg (DE)

(73) Assignee: Coverstro Deutschland AG, Leverkusen (DE)

( * ) Notice: Subject to any disclaimer, the term of this patent is extended or adjusted under 35 U.S.C. 154(b) by 56 days.

(21) Appl. No.: 15/742,631

(22) PCT Filed: Jul. 5, 2016

(86) PCT No.: PCT/EP2016/065825
§ 371 (c)(1),
(2) Date: Jan. 8, 2018

(87) PCT Pub. No.: WO2017/005735
PCT Pub. Date: Jan. 12, 2017

(65) Prior Publication Data
US 2018/0201780 A1    Jul. 19, 2018

(30) Foreign Application Priority Data

Jul. 8, 2015 (EP) .................................. 15175789

(51) Int. Cl.
| | | |
|---|---|---|
| C08K 3/013 | (2018.01) |
| C08L 69/00 | (2006.01) |
| C08K 3/04 | (2006.01) |
| C08K 5/103 | (2006.01) |
| C08K 3/22 | (2006.01) |
| C08K 3/30 | (2006.01) |
| C08K 3/34 | (2006.01) |

(52) U.S. Cl.
CPC .............. *C08L 69/00* (2013.01); *C08K 3/013* (2018.01); *C08K 3/04* (2013.01); *C08K 3/22* (2013.01); *C08K 3/30* (2013.01); *C08K 3/34* (2013.01); *C08K 5/103* (2013.01); *C08K 2003/2241* (2013.01); *C08K 2003/3045* (2013.01); *C08K 2201/001* (2013.01)

(58) Field of Classification Search
USPC .................. 524/317; 528/196, 198
See application file for complete search history.

(56) References Cited

U.S. PATENT DOCUMENTS

| | | |
|---|---|---|
| 1,137,373 A | 4/1915 | Aylsworth |
| 1,191,383 A | 7/1916 | Aylsworth |
| 2,891,920 A | 6/1959 | Hyde et al. |
| 2,991,273 A | 7/1961 | Hechelhammer et al. |
| 2,999,825 A | 9/1961 | Floyd et al. |
| 2,999,846 A | 9/1961 | Schnell et al. |
| 3,028,635 A | 4/1962 | Herubel |
| 3,148,172 A | 9/1964 | Fox |
| 3,271,367 A | 9/1966 | Schnell et al. |
| 3,294,725 A | 12/1966 | Findlay et al. |
| 3,404,061 A | 10/1968 | Shane et al. |
| 3,879,348 A | 4/1975 | Serini et al. |
| 4,806,593 A | 2/1989 | Kress et al. |
| 4,812,515 A | 3/1989 | Kress et al. |
| 4,859,740 A | 8/1989 | Damrath et al. |
| 4,861,831 A | 8/1989 | Damrath et al. |
| 4,888,388 A | 12/1989 | Hongo et al. |
| 4,982,014 A | 1/1991 | Freitag et al. |
| 5,097,002 A | 3/1992 | Sakashita et al. |
| 5,288,778 A | 2/1994 | Schmitter et al. |
| 5,340,905 A | 8/1994 | Kühling et al. |
| 5,717,057 A | 2/1998 | Sakashita et al. |
| 5,807,914 A | 9/1998 | Obayashi et al. |
| 5,821,380 A | 10/1998 | Holderbaum et al. |
| 5,883,165 A | 3/1999 | Kröhnke et al. |
| 6,331,584 B1 | 12/2001 | Nodera et al. |
| 6,596,840 B1 | 7/2003 | Kratschmer et al. |
| 6,740,730 B1 | 5/2004 | Kratschmer et al. |
| 7,071,284 B2 | 7/2006 | Kauth et al. |
| 9,006,156 B2 | 4/2015 | Saccomando et al. |
| 2012/0319031 A1 | 12/2012 | Li et al. |
| 2014/0353544 A1 | 12/2014 | Guo et al. |

FOREIGN PATENT DOCUMENTS

| | | |
|---|---|---|
| DE | 1570703 A1 | 2/1970 |
| DE | 2036052 A1 | 1/1972 |
| DE | 2063050 A1 | 7/1972 |
| DE | 2211956 A1 | 10/1973 |
| DE | 3631539 A1 | 3/1988 |
| DE | 3631540 A1 | 3/1988 |
| DE | 3704655 A1 | 8/1988 |
| DE | 3704657 A1 | 8/1988 |
| DE | 3832396 A1 | 2/1990 |
| EP | 0500496 A1 | 8/1992 |
| EP | 0839623 A1 | 5/1998 |
| EP | 0994155 A2 | 4/2000 |
| EP | 1424360 A1 | 6/2004 |
| EP | 2036952 A1 | 3/2009 |
| EP | 2430134 A1 | 3/2012 |
| FR | 1561518 A | 3/1969 |
| GB | 1122003 A | 7/1968 |
| GB | 1229482 A | 4/1971 |
| GB | 1367790 A | 9/1974 |
| JP | S6162039 A | 3/1986 |
| JP | S6162040 A | 3/1986 |

(Continued)

OTHER PUBLICATIONS

International Search Report for PCT/EP2016/065825 dated Sep. 14, 2016.

(Continued)

*Primary Examiner* — Terressa Boykin
(74) *Attorney, Agent, or Firm* — Drinker Biddle & Reath LLP

(57) ABSTRACT

The present invention relates to the use of diglycerol esters to enhance the flowability of graphite-containing, thermally conductive polycarbonate compositions. Melt viscosities and melt volume flow rates are improved.

14 Claims, No Drawings

(56) References Cited

FOREIGN PATENT DOCUMENTS

| | | |
|---|---|---|
| JP | S61105550 A | 5/1986 |
| JP | 2011256359 A | 12/2011 |
| WO | WO-9615102 A2 | 5/1996 |
| WO | WO-0105867 A1 | 1/2001 |
| WO | WO-200105866 A1 | 1/2001 |
| WO | WO-2004063249 A1 | 7/2004 |

OTHER PUBLICATIONS

International Search Report for PCT/EP2016/065833 dated Sep. 14, 2016.
Written Opinion of the International Searching Authority for PCT/EP2016/065825 dated Sep. 14, 2016.
Written Opinion of the International Searching Authority for PCT/EP2016/065833 dated Sep. 14, 2016.

IMPROVING THE FLOWABILITY OF THERMOCONDUCTIVE POLYCARBONATE COMPOSITIONS

CROSS-REFERENCE TO RELATED APPLICATIONS

This application is a national stage application (under 35 U.S.C. § 371) of PCT/EP2016/065825, filed Jul. 5, 2016, which claims benefit of European Application No. 1517589.5, filed Jul. 8, 2015, both of which are incorporated herein by reference in their entirety.

The present invention relates to thermally conductive polycarbonate compositions having improved flowability.

In the context of the invention the term "polycarbonate compositions" is to be understood as meaning compositions comprising polycarbonate as the main polymer component.

Thermally conductive polycarbonate compositions are employed in particular in the electrical and electronics industries for heat management, for example for heat sinks, cooling elements or housings in the LED sector, for coil encasements or housings of hard disks or other mass storage devices, circuit mounts in three-dimensional MID applications or in construction and connection technology for heat removal from electronic component parts.

The thermal conductivity of polycarbonate compositions may be achieved by addition of a thermally conductive filler, typically a graphite, in particular an expanded graphite. However, due to the necessary quantity of graphite required to achieve an appreciable thermal conductivity the melt viscosities of the compositions are so high that addition of a flow enhancer is necessary for processing the compositions.

Particularly in the case of thin-walled casing parts a low melt viscosity is required to be able to realize component parts of uniform wall thickness. Low melt viscosities are moreover essential for realization of one-piece component parts of relatively complex construction from one material.

Bisphenol A diphosphate (BDP) is customarily used for flow enhancement, specifically in amounts of up to more than 10 wt % in order to achieve the desired effect. However, this severely reduces heat resistance which is disadvantageous for the component part properties.

It is accordingly a particular object of the present invention to improve the flowability of thermally conductive polycarbonate compositions while simultaneously achieving good melt stability and to provide corresponding polycarbonate compositions.

It has now been found that, surprisingly, this object is achieved by the use of diglycerol esters in thermally conductive polycarbonate compositions comprising graphite.

The object is moreover achieved by polycarbonate compositions comprising

A) A) 20 to 94.8 wt %, preferably 60 to 89.8 wt %, particularly preferably 65 to 85 wt %, of aromatic polycarbonate,
B) 5 to 40 wt %, preferably 10 to 35 wt %, particularly preferably 15 to 35 wt %, very particularly preferably 20 to 25 wt %, of graphite and
C) 0.2 wt % to 3.0 wt %, preferably 0.2 to 2.5 wt %, particularly preferably 0.2 to 2.0 wt %, very particularly preferably 0.2 to 1.8 wt % of diglycerol ester.

In one embodiment no further components are present.

The polycarbonate compositions to which diglycerol ester was added exhibit good melt stabilities with improved rheological properties, namely a higher melt volume flow rate (MVR) determined as per DIN EN ISO 1133 (test temperature 300° C., mass 1.2 kg, DIN EN ISO 1133-1: 2012-03) and an improved melt viscosity determined as per ISO 11443 (ISO 11443:2014-04) compared to corresponding compositions comprising otherwise the same components except for the diglycerol ester. These compositions are further characterized by a good heat resistance measurable by reference to the glass transition temperature which is determined by means of DSC (2nd heating, heating rate: 20 K/min).

The polycarbonate compositions according to the invention may comprise further customary additives. Further customary additives include for example demoulding agents, heat and/or transesterification stabilizers, flame retardants, anti-dripping agents, antioxidants, inorganic pigments, carbon black, dyes and/or inorganic fillers such as titanium dioxide, silicates, talc and/or barium sulfate.

It is preferable when the compositions according to the invention comprise no further components in addition to components A to C and one or more of the components demoulding agents, heat and/or transesterification stabilizers, flame retardants, anti-dripping agents, antioxidants, inorganic pigments, carbon black, dyes and/or inorganic fillers such as titanium dioxide, silicates, talc and/or barium sulfate.

It is yet more preferable when such polycarbonate compositions are consisting of A) 74.0 to 85.0 wt % of aromatic polycarbonate,
B) 5 to 25 wt % of graphite,
C) 0.2 to 2.0% wt %, preferably 0.2 to 1.8 wt %, of diglycerol ester,
D) optionally up to 1.0 wt % of heat stabilizer and/or transesterification stabilizer and/or
E) optionally up to 10.0 wt % of one or more further additives from the group consisting of demoulding agents, flame retardants, anti-dripping agents, antioxidants, inorganic pigments, carbon black, dyes and/or inorganic fillers such as titanium dioxide, silicates, talc and/or barium sulfate.

It is particularly preferable when the polycarbonate compositions comprise

A) 74.0 wt % to 79.6 wt % of an aromatic polycarbonate,
B) 20 to 25 wt % of graphite,
C) 0.2 to 1.8 wt % of diglycerol ester,
D) optionally up to 1.0 wt % of heat stabilizer and/or transesterification stabilizer and/or
E) optionally up to 10.0 wt % of one or more further additives from the group consisting of demoulding agents, flame retardants, anti-dripping agents, antioxidants, inorganic pigments, carbon black, dyes and/or inorganic fillers such as titanium dioxide, silicates, talc and/or barium sulfate.

Very particularly preferred compositions comprise no further components, i.e. are consisting of these components A) to E).

These yet more/particularly preferred compositions preferably employ as diglycerol ester diglycerol monolauryl ester, optionally with further diglycerol esters. The compositions according to the invention preferably employ expanded graphite.

The compositions in which flowability is improved in the manner according to the invention are preferably used for producing mouldings. The improved flowability renders said compositions particularly suitable for the production of thin component parts.

The melt viscosities of the compositions are strongly dependent on the amount of the employed graphite. Increasing amounts also cause the melt viscosity to increase at various shear rates, determined as per ISO 11443 (cone and plate arrangement, ISO 11443:2014-04). The melt viscosities determined at 340° C. and a shear rate of 1000 1/s are preferably below 300 Pa·s, more preferably below 200 Pa·s.

The individual constituents of the compositions according to the invention are more particularly elucidated hereinbelow:

Component A

In accordance with the invention the term "polycarbonate" is to be understood as meaning both homopolycarbonates and copolycarbonates. These polycarbonates may be linear or branched in known fashion. Mixtures of polycarbonates may also be used according to the invention.

Some, up to 80 mol %, preferably from 20 mol % up to 50 mol %, of the carbonate groups in the polycarbonates employed in accordance with the invention may be replaced by aromatic dicarboxylic ester groups. Such polycarbonates, incorporating both acid radicals from the carbonic acid and acid radicals from aromatic dicarboxylic acids in the molecule chain, are referred to as aromatic polyestercarbonates. In the context of the present invention, they are subsumed by the umbrella term "thermoplastic aromatic polycarbonates".

The replacement of the carbonate groups by the aromatic dicarboxylic ester groups proceeds essentially stoichiometrically and also quantitatively and the molar ratio of the coreactants is therefore reflected in the final polyestercarbonate. The incorporation of the aromatic dicarboxylic ester groups may be effected either randomly or else blockwise.

The thermoplastic polycarbonates including the thermoplastic aromatic polyestercarbonates have average molecular weights $M_w$ (determined by measuring the relative viscosity at 25° C. in $CH_2Cl_2$ and a concentration of 0.5 g per 100 ml of $CH_2Cl_2$) of 20 000 g/mol to 32 000 g/mol, preferably of 23 000 g/mol to 31 000 g/mol, in particular of 24 000 g/mol to 31 000 g/mol.

The polycarbonates present in the compositions to which diglycerol ester is added to improve flowability are produced in known fashion from diphenols, carboxylic acid derivatives, optionally chain terminators and branching agents.

Particulars pertaining to the production of polycarbonates are disclosed in many patent documents spanning approximately the last 40 years. Reference is made here, for example, to Schnell, "Chemistry and Physics of Poly/carbonates", Polymer Reviews, Volume 9, interscience Publishers, New York, London, Sydney 1964, to a Freitag, U. Grigo, P. R. Müller, H. Nouvertné, BAYER AG, "Polycarbonates" in Encyclopedia of Polymer Science and Engineering, Volume 11, Second Edition, 1988, pages 648-718, and finally to U. Grigo, K. Kirchner and P. R. Müller "Polycarbonate" in Becker/Braun, Kunststoff-Handbuch, Volume 3/1, Polycarbonate, Polyacetale, Polyester, Celluloseester, Carl Hanser Verlag Munich, Vienna 1992, pages 117-299.

The production of aromatic polycarbonates is effected for example by reaction of diphenols with carbonic halides, preferably phosgene, and/or with aromatic dicarbonyl dihalides, preferably benzenedicarbonyl dihalides, by the interfacial process, optionally using chain terminators and optionally using trifunctional or more than trifunctional branching agents, production of the polyestercarbonates being achieved by replacing a portion of the carbonic acid derivatives with aromatic dicarboxylic acids or derivatives of the dicarboxylic acids, specifically with aromatic dicarboxylic ester structural units according to the carbonate structural units to be replaced in the aromatic polycarbonates. Production via a melt polymerization process by reaction of diphenols with, for example, diphenyl carbonate is likewise possible.

Dihydroxyaryl compounds suitable for producing polycarbonates are those of formula (2)

$$\text{HO—Z—OH} \tag{2}$$

where
Z is an aromatic radical which has 6 to 30 carbon atoms and may comprise one or more aromatic rings, may be substituted and may comprise aliphatic or cycloaliphatic radicals or alkylaryls or heteroatoms as bridging elements.

It is preferable when Z in formula (2) stands for a radical of formula (3)

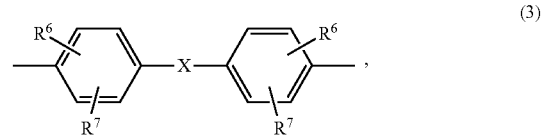

(3)

where
$R^6$ and $R^7$ each independently of one another stand for Ft, $C_1$- to $C_{18}$-alkyl-, $C_1$- to $C_{18}$-alkoxy, halogen such as Cl or Br or respectively optionally substituted aryl or aralkyl, preferably for H or $C_1$- to $C_{12}$-alkyl, particularly preferably for 14 or $C_1$- to $C_8$-alkyl and very particularly preferably for H or methyl, and X stands for a single bond, —$SO_2$—, —CO—, —O—, —S—, $C_1$- to $C_6$-alkylene, $C_2$- to $C_5$-alkylidene or $C_5$- to $C_6$-cycloalkylidene which may be substituted with $C_1$- to $C_8$-alkyl, preferably methyl or ethyl, further for $C_6$- to $C_{12}$-arylene which may optionally be fused to further aromatic rings comprising heteroatoms.

X preferably stands for a single bond, $C_1$- to $C_5$-alkylene, $C_2$- to $C_5$-alkylidene, $C_5$- to $C_6$-cycloalkylidene, —O—, —SO—, —CO—, —S—, —$SO_2$—
or for a radical of formula (3a)

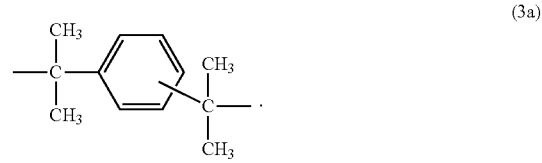

(3a)

Diphenols suitable for the production of polycarbonates are for example hydroquinone, resorcinol, dihydroxydiphenyls, bis(hydroxyphenyl)alkanes, bis(hydroxyphenyl)cycloalkanes, bis(hydroxyphenyl)sulphides, bis(hydroxyphenyl)ethers, bis(hydroxyphenyl)ketones, bis(hydroxyphenyl)sulphones, bis(hydroxyphenyl)sulphoxides, α,α'-bis(hydroxyphenyl)diisopropylbenzenes, phthalimidines derived from derivatives of isatin or phenolphthalein and the ring-alkylated, ring-arylated and ring-halogenated compounds thereof.

Preferred diphenols are 4,4'-dihydroxybiphenyl, 2,2-bis(4-hydroxyphenyl)propane (bisphenol A), 2,4-bis(4-hydroxyphenyl)-2-methylbutane, 1,1-bis(4-hydroxyphenyl)-p-diisopropylbenzene, 2,2-bis(3-methyl-4-hydroxyphenyl)propane, dimethylbisphenol A, bis(3,5-dimethyl-4-hydroxyphenyl)methane, 2,2-bis(3,5-dimethyl-4-hydroxyphenyl)propane, bis(3,5-dimethyl-4-hydroxyphenyl)sulphone, 2,4-bis(3,5-dimethyl-4-hydroxyphenyl)-2-methylbutane, 1,1-bis(3,5-dimethyl-4-hydroxyphenyl)-p-di isopropylbenzene and 1,1-bis(4-hydroxyphenyl)-3,3,5-trimethylcyclohexane.

Particularly preferred diphenols are 2,2-bis(4-hydroxyphenyl)propane (bisphenol A), 2,2-bis(3,5-dimethyl-4-hydroxyphenyl)propane, 1,1-bis(4-hydroxyphenyl)cyclohexane, 1,1-bis(4-hydroxyphenyl)-3,3,5-trimethylcyclohexane and dimethylbisphenol A.

These and other suitable diphenols are described for example in U.S. Pat. Nos. 3,028,635, 2,999,825, 3,148,172, 2,991,273, 3,271,367, 4,982,014 and U.S. Pat. No. 2,999, 846, in DE-A 1 570 703, DE-A 2063 050, DE-A 2 036 052, DE-A 2 211 956 and DE-A 3 832 396, in FR-A 1 561 518, in the monograph "H. Schnell, Chemistry and Physics of Polycarbonates, Interscience Publishers, New York 1964" and also in JP-A 62039/1986, JP-A 62040/1986 and JP-A 105550/1986.

In the case of homopolycarbonates only one diphenol is employed and in the case of copolycarbonates two or more diphenols are employed. The diphenols employed, similarly to all other chemicals and assistants added to the synthesis, may be contaminated with contaminants from their own synthesis, handling and storage. However, it is desirable to employ the purest possible raw materials.

Suitable carbonic acid derivatives are for example phosgene and diphenyl carbonate.

Suitable chain terminators that may be employed in the production of polycarbonates are monophenols. Suitable monophenols are for example phenol itself, alkylphenols such as cresols, p-tert-butylphenol, cumylphenol and mixtures thereof.

Preferred chain terminators are phenols which are mono- or polysubstituted with linear or branched, preferably unsubstituted $C_1$ to $C_{30}$ alkyl radicals or with tert-butyl. Particularly preferred chain terminators are phenol, cumylphenol and/or p-tert-butylphenol.

The amount of chain terminator to be employed is preferably 0.1 to 5 mol % based on moles of diphenols employed in each case. The chain terminators can be added before, during or after the reaction with a carbonic acid derivative.

Suitable branching agents are the trifunctional or more than trifunctional compounds known in polycarbonate chemistry, in particular those having three or more than three phenolic OH groups.

Suitable branching agents are for example 1,3,5-tri(4-hydroxyphenyl)benzene, 1,1,1-tri(4-hydroxyphenyl)ethane, tri(4-hydroxyphenyl)phenylmethane, 2,4-bis(4-hydroxyphenylisopropyl)phenol, 2,6-bis(2-hydroxy-5'-methylbenzyl)-4-methylphenol, 2-(4-hydroxyphenyl)-2-(2,4-dihydroxyphenyl)propane, tetra(4-hydroxyphenyl)methane, tetra (4-(4-hydroxyphenylisopropyl)phenoxy)methane and 1,4-bis((4',4''-dihydroxytriphenyl)methyl)benzene and 3,3-bis (3-methyl-4-hydroxyphenyl)-2-oxo-2,3-dihydroindole.

The amount of the branching agents for optional employment is preferably from 0.05 mol % to 2.00 mol % based on moles of diphenols used in each case.

The branching agents can either be initially charged with the diphenols and the chain terminators in the aqueous alkaline phase or added dissolved in an organic solvent before the phosgenation. In the case of the transesterification process the branching agents are employed together with the diphenols.

Particularly preferred polycarbonates are the homopolycarbonate based on bisphenol A, the homopolycarbonate based on 1,3-bis(4-hydroxyphenyl)-3,3,5-trimethylcyclohexane and the copolycarbonates based on the two monomers bisphenol A and 1,1-bis(4-hydroxyphenyl)-3,3,5-trimethylcyclohexane.

Preferred modes of production of the polycarbonates for use in accordance with the invention, including the polyestercarbonates, are the known interfacial process and the known melt transesterification process (cf. e.g. WO 2004/063249 A1, WO 2001/05866 A1, WO 2000/105867, U.S. Pat. Nos. 5,340,905 A, 5,097,002 A, 5,717,057 A).

To achieve incorporation of additives component A is preferably employed in the form of powders, pellets or mixtures of powders and pellets.

The polycarbonate employed may also be a mixture of different polycarbonates, for example of polycarbonates A1 and A2.

It is preferable when the amount of the aromatic polycarbonate A1 based on the total amount of polycarbonate is 25.0 to 85.0 wt %, preferably 28.0 to 84.0 wt %, particularly preferably 30.0 to 83.0 wt %, wherein this aromatic polycarbonate is based on bisphenol A and preferably has a melt volume flow rate MVR of 7 to 15 cm$^3$/10 min, more preferably has a melt volume flow rate MVR of 8 to 12 cm$^3$/10 min and particularly preferably has a melt volume flow rate MVR of 8 to 11 cm$^3$/10 min determined to ISO 1133 (test temperature 300° C., mass 1.2 kg, DIN EN ISO 1133-1:2012-03).

It is preferable when the amount of the pulverulent aromatic polycarbonate A2 based on the total amount of polycarbonate is 3.0 to 12.0 wt %, preferably 4.0 to 11.0 wt %, particularly preferably 5 to 10.0 wt %, wherein this aromatic polycarbonate is based on bisphenol A and preferably has a melt volume flow rate MVR of 3 to 8 cm$^3$/10 min, more preferably has a melt volume flow rate MVR of 4 to 7 cm$^3$/10 min and particularly preferably has a melt volume flow rate MVR of 8 to 6 cm$^3$/10 min determined to ISO 1133 (test temperature 300° C., mass 1.2 kg, DIN EN ISO 1133-1:2012-03).

Compositions according to the invention altogether employ 20 to 94.8 wt %, preferably 60 to 89.8 wt %, more preferably 65 to 85 wt %, particularly preferably 74.0 to 85.0 wt %, very particularly preferably 74.0 to 79.6 wt %, of aromatic polycarbonate.

Component B

Graphites are used in the compositions in the form of fibres, rods, beads, hollow beads, platelets and/or in powder form, in each case either in aggregated or agglomerated form, preferably in platelet form.

In accordance with the invention a particle having a platelet structure is to be understood as meaning a particle having a flat geometry. Thus, the height of the particles is typically markedly smaller compared to the width or length of the particles. Such flat particles may in turn be agglomerated or aggregated into constructs.

Preference is given to using expanded graphite, alone or in admixture with unexpanded graphite, particularly preferably only expended graphite.

In expanded graphites, the individual basal planes of the graphite have been driven apart by a special treatment which results in an increase in volume of the graphite, preferably by a factor of 200 to 400. The production of expanded graphites is described inter alia in documents U.S. Pat. Nos. 1,137,373 A, 1,191,383 A and 3,404,061 A.

Preference according to the invention is given to using an expanded graphite having a relatively high specific surface area (expanded graphite flake), determined as the BET surface area by means of nitrogen adsorption as per ASTM D3037. Preference is given to using graphites having a BET surface area of ≥5 m$^2$/g, particularly preferably ≥10 m$^2$/g and very particularly preferably ≥18 m$^2$/g in the thermoplastic compositions.

Commercially available graphites are inter alia Ecophit® GFG 5, Ecophit® GM 50, Ecophit® GFG 200, Ecophit® GFG 350, Ecophit® GFG 500, Ecophit® GFG 900, Ecophit® GFG 1200 from SGL Carbon GmbH, TIMREX® BNB90, TIMREX® KS5-44, TIMREX® KS6, TIMREX® KS150, TIMREX® SFG44, TIMREX® SFG150, TIMREX® C-THERM™ 001 and TIMREX® C-THERM™ 011 from TIMCAL Ltd., SC 20 O, SC 4000 O/SM and SC 8000 O/SM from Graphit Kropfmühl AG, Mechano-Cond 1, Mechano-Lube 2 and Mechano-Lube 4G from H.C. Carbon GmbH, Nord-Min 251 and Nord-Min 560T from Nordmann Rassmann GmbH and ASBURY A99, Asbury 230U and Asbury 3806 from Asbury Carbons.

Component C

The diglycerol esters employed as flow enhancers are esters of carboxylic acids and diglycerol. Esters based on various carboxylic acids are suitable. The esters may also be based on different isomers of diglycerol. It is possible to use not only monoesters but also polyesters of diglycerol. It is also possible to use mixtures instead of pure compounds.

Isomers of diglycerol which form the basis of the diglycerol esters employed in accordance with the invention are the following:

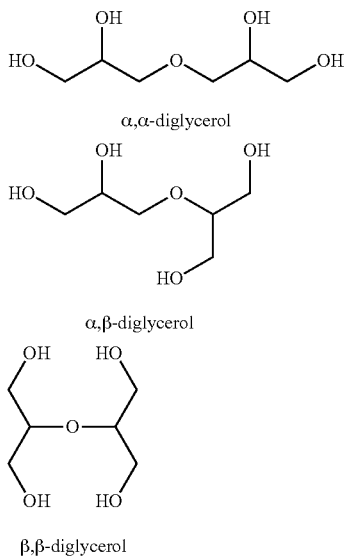

α,α-diglycerol

α,β-diglycerol

β,β-diglycerol

Mono- or polyesterified isomers of these formulae can be employed as the diglycerol esters used in accordance with the invention. Mixtures employable as flow enhancers consist of the diglycerol reactants and the ester end products derived therefrom, for example having molecular weights of 348 g/mol (monolauryl ester) or 530 g/mol (dilauryl ester).

The diglycerol esters present in the composition according to the invention preferably derive from saturated or unsaturated monocarboxylic acids having a chain length of from 6 to 30 carbon atoms. Suitable monocarboxylic acids are for example caprylic acid ($C_7H_{15}COOH$, octanoic acid), capric acid ($C_9H_{19}COOH$, decanoic acid), lauric acid ($C_{11}H_{23}COOH$, dodecanoic acid), myristic acid ($C_{13}H_{27}COOH$, tetradecanoic acid), palmitic acid ($C_{15}H_{31}COOH$, hexadecanoic acid), margaric acid ($C_{16}H_{33}COOH$, heptadecanoic acid), stearic acid ($C_{17}H_{35}COOH$, octadecanoic acid), arachidic acid ($C_{19}H_{39}COOH$, eicosanoic acid), behenic acid ($C_{21}H_{43}COOH$, docosanoic acid), lignoceric acid ($C_{23}F_{47}COOH$, tetracosanoic acid), palmitoleic acid ($C_{15}H_{29}COOH$, (9Z)-hexadeca-9-enoic acid), petroselic acid ($C_{17}H_{33}COOH$, (6Z)-octadeca-6-enoic acid), elaidic acid ($C_{17}H_{33}COOH$, (9E)-octadeca-9-enoic acid), linoleic acid ($C_{17}H_{31}CooH$, (9Z,12Z)-octadeca-9,12-dienoic acid), alpha- or gamma-linolenic acid ($C_{17}/H_{29}COOH$, (9Z,12Z, 15Z)-octadeca-9,12,15-trienoic acid and (6Z,9Z, 12Z)-octadeca-6,9,12-trienoic acid), arachidonic acid ($C_{19}H_{31}COOH$, (5Z,8Z,11Z,14Z)-eicosa-5,8,11,14-tetraenoic acid), timnodonic acid ($C_{19}H_{29}COOH$, (5Z,8Z,11Z,14Z,17Z)-eicosa-5,8,11,14,17-pentaenoic acid) and cervonic acid ($C_{21}H_{31}COOH$, (4Z,7Z,10Z,13Z,16Z,19Z)-docosa-4,7,10, 13,16,19-hexaenoic acid). Particular preference is given to lauric acid, palmitic acid and/or stearic acid.

It is particularly preferable when as diglycerol ester at least one ester of formula (I) is present where R=$COC_nH_{2n+1}$ and/or R=COR',

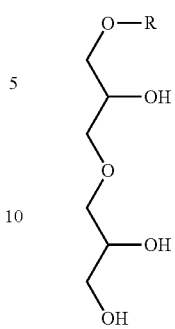

(I)

wherein n is an integer and R' is a branched alkyl radical or a branched or unbranched alkenyl radical and $C_nH_{2n+1}$ is an aliphatic, saturated linear alkyl radical.

n is preferably an integer from 6-24 and examples of $C_nH_{2n+1}$ are therefore n-hexyl, n-heptyl, n-octyl, n-nonyl, n-decyl, n-dodecyl, n-tridecyl, n-tetradecyl, n-hexadecyl or n-octadecyl. More preferably n=8 to 18, particularly preferably 10 to 16, very particularly preferably 12 (diglycerol monolaurate isomer having a molecular weight of 348 g/mol, which is particularly preferred as the main product in a mixture). It is preferable in accordance with the invention when the abovementioned ester moieties are present also in the case of the other isomers of diglycerol.

A mixture of various diglycerol esters may therefore also be concerned.

Preferably employed diglycerol esters have an HLB value of at least 6, particularly preferably 6 to 12, the HLB value being defined as the "hydrophilic-lipophilic balance", calculated as follows according to the Griffin method:

$$HLB = 20 \times (1 - M_{lipophilic}/M),$$

wherein $M_{lipophilic}$ is the molar mass of the lipophilic proportion of the diglycerol ester and M is the molar mass of the diglycerol ester.

Component D

The compositions according to the invention optionally comprise one or more heat and/or transesterification stabilizers.

Preferentially suitable heat stabilizers are triphenylphosphine, tris(2,4-di-tert-butylphenyl) phosphite (Irgafos® 168), tetrakis(2,4-di-tert-butylphenyl)-[1,1-biphenyl]-4,4'-diyl bisphosphonite, octadecyl-3-(3,5-di-tert-butyl-4-hydroxyphenyl) propionate (Irganox® 1076), bis(2,4-dicumylphenyl)pentaerythritol diphosphite (Doverphos® S-9228-PC), bis(2,6-di-tert-butyl-4-methylphenyl)pentaerythritol diphosphite (ADK STAB PEP-36). Said heat stabilizers are employed alone or in admixture (for example Irganox® B900 (mixture of Irgafos® 168 and Irganox® 1076 in a 1:3 ratio) or Doverphos® S-9228-PC with Irganox® B900/ Irganox® 1076).

Preferably present transesterification stabilizers are phosphates or sulfonic esters. A preferably present stabilizer is triisooctyl phosphate.

The heat stabilizers and/or transesterification stabilizers are preferably employed in an amount up to 1.0 wt %, particularly preferably in a total amount of 0.003 to 0.2 wt %.

Component E

Optionally present in addition are up to 10.0 wt %, preferably 0.10 to 8.0 wt %, particularly preferably 0.2 to 3 wt %, of further customary additives ("further additives"). The group of further additives does not include heat stabilizers or transesterification stabilizers since these are described hereinabove as component C.

These additives, typically added to polycarbonate-containing compositions, are in particular the flame retardants, anti-dripping agents, antioxidants, carbon black and/or dyes, inorganic fillers such as titanium dioxide, silicates, talc and/or barium sulphate and/or demoulding agents described in EP-A 0 839 623, WO-A 96/15102, EP-A 0 500 496 or "Plastics Additives Handbook", Hans Zweifel, 5th Edition 2000, Homer Verlag, Munich in the amounts customary for polycarbonate. These additives may be added individually or else in admixture.

The composition is preferably free of demoulding agents, for example glycerol monostearate (GMS) since the diglycerol ester itself acts as a demoulding agent.

The production of the polycarbonate compositions comprising components A to C and optionally D and/or E is effected by commonly used incorporation processes by combination, mixing and homogenization of the individual constituents, wherein in particular the homogenization preferably takes place in the melt under the influence of shear forces. Combination and mixing is optionally effected prior to melt homogenization using powder premixes.

It is also possible to use premixes of pellets, or of pellets and powders, with components B to E.

It is also possible to use premixes produced from solutions of the mixture components in suitable solvents with optional homogenization in solution and subsequent removal of the solvent.

In particular, components B to E of the composition according to the invention may be introduced into the polycarbonate here by known processes or in the form of masterbatch.

Preference is given to the use of masterbatches to introduce components B to E, individually or in admixture.

In this connection the composition according to the invention may be combined, mixed, homogenized and subsequently extruded in conventional apparatuses such as screw extruders (for example ZSK twin-screw extruders), kneaders or Brabender or Banbury mills. After extrusion the extrudate can be cooled and comminuted. It is also possible to premix individual components and then to add the remaining starting materials singly and/or likewise mixed.

The combining and commixing of a premix in the melt may also be effected in the plasticizing unit of an injection moulding machine. In this case, the melt is directly converted into a moulded article in a subsequent step.

The plastics material mouldings are preferably produced by injection moulding.

The thermally conductive polycarbonate compositions to which diglycerol ester has been added to improve flowability are suitable for the production of component parts for the electrical and electronics industries, for heat management, in particular for complex cooling elements, cooling fins, heatsinks and housings in lighting technology, for example lamps or headlights.

EXAMPLES

1. Description of Raw Materials and Test Methods

The polycarbonate compositions described in the following examples were produced by compounding on a Berstorff ZE 25 extruder at a throughput of 10 kg/h. The melt temperature was 275° C.

Component A-1: linear polycarbonate based on bisphenol A having a melt volume flow rate MVR of 16.5 cm³/10 min (as per ISO 1133 (DIN EN ISO 1133-1:2012-03) at a test temperature of 250° C. under a 2.16 kg load).

Component A-2: powdered linear polycarbonate based on bisphenol A having a melt volume flow rate MVR of 19 cm³/10 min (as per ISO 1133 (DIN EN ISO 1133-1:2012-03) at a test temperature of 300° C. under a 1.2 kg load).

Component B-1: Ecophit SC4000 O/MS expanded graphite from SGL Carbon SE, Wiesbaden.

Component B-2: Ecophit GFG500 expanded graphite from SGL Carbon SE, Wiesbaden.

Component C: Poem DL-100 (diglycerol monolaurate) from Riken Vitamin as flow enhancer.

Component D: triisooctyl phosphate (TOF) from Lanxess AG as transesterification stabilizer.

Melt volume flow rate (MVR) was determined as per ISO 1133 (test temperature 300° C., mass kg, DIN EN ISO 1133-1:2012-03) with a Zwick 4106 apparatus from Zwick Roell.

Melt viscosities were determined as per ISO 11443 (cone-and-plate arrangement).

2. Compositions

TABLE 1

|  |  | V1 | B1 | B2 | B3 |
|---|---|---|---|---|---|
| A-1 | wt % | 68.00 | 68.00 | 68.00 | 68.00 |
| A-2 | wt % | 7.00 | 6.20 | 6.00 | 5.80 |
| B-1 | wt % | 25.00 | 25.00 | 25.00 | 25.00 |
| C | wt % | — | 0.80 | 1.00 | 1.20 |
| melt viscosity at 320° C. | | | | | |
| eta 50 | Pa · s | 473 | 480 | 338 | 307 |
| eta 100 | Pa · s | 360 | 407 | 213 | 212 |
| eta 200 | Pa · s | 280 | 327 | 141 | 149 |
| eta 500 | Pa · s | 190 | 206 |  | 103 |
| eta 1000 | Pa · s | 150 | 135 |  | 85 |
| eta 1500 | Pa · s | 129 | 102 |  | 74 |
| eta 5000 | Pa · s | 76 |  |  |  |
| melt viscosity at 340° C. | | | | | |
| eta 50 | Pa · s | 284 | 185 | 126 | 151 |
| eta 100 | Pa · s | 220 | 158 | 89 | 83 |
| eta 200 | Pa · s | 166 | 126 | 61 | 60 |
| eta 500 | Pa · s | 113 | 84 |  | 44 |
| eta 1000 | Pa · s | 94 | 63 |  | 35 |
| eta 1500 | Pa · s | 84 | 51 |  | 32 |
| eta 5000 | Pa · s |  |  |  |  |
| melt viscosity at 360° C. | | | | | |
| eta 50 | Pa · s | 205 |  |  |  |
| eta 100 | Pa · s | 153 |  |  |  |
| eta 200 | Pa · s | 110 |  |  |  |
| eta 500 | Pa · s | 78 |  |  |  |
| eta 1000 | Pa · s |  |  |  |  |
| eta 1500 | Pa · s |  |  |  |  |
| eta 5000 | Pa · s |  |  |  |  |

The melt viscosity values are each reported in Table 1 for the shear rates in [1/sec]. Blank fields denote that the compositions had such a high flowability that the melt viscosity could no longer be determined.

Table 1 shows that the compositions to which diglycerol ester has been added in accordance with the invention exhibit a marked improvement in melt viscosity measured at various temperatures at different shear rates. When the amount of diglycerol ester added is sufficiently high the compositions each show markedly reduced melt viscosities even over the entire shear range at various measuring temperatures which indicates improved flowability.

TABLE 2

|  |  | V2 | B4 | B5 | B6 |
|---|---|---|---|---|---|
| A-1 | wt % | 73.00 | 73.00 | 73.00 | 73.00 |
| A-2 | wt % | 7.00 | 6.79 | 6.69 | 6.59 |
| B-2 | wt % | 20.00 | 20.00 | 20.00 | 20.00 |
| C | wt % | — | 0.20 | 0.30 | 0.40 |
| D | wt % | — | 0.01 | 0.01 | 0.01 |
| melt viscosity at 320° C. | | | | | |
| eta 50 | Pa · s | 467 | 390 | 405 | 394 |
| eta 100 | Pa · s | 357 | 301 | 305 | 290 |
| eta 200 | Pa · s | 267 | 232 | 231 | 226 |
| eta 500 | Pa · s | 190 | 168 | 167 | 161 |
| eta 1000 | Pa · s | 149 | 135 | 133 | 127 |
| eta 1500 | Pa · s | 129 | 115 | 114 | 110 |
| eta 5000 | Pa · s | 77 | 69 | 69 | 68 |
| melt viscosity at 340° C. | | | | | |
| eta 50 | Pa · s | 314 | 260 | 254 | 237 |
| eta 100 | Pa · s | 241 | 198 | 193 | 183 |
| eta 200 | Pa · s | 183 | 154 | 148 | 141 |
| eta 500 | Pa · s | 130 | 111 | 104 | 99 |
| eta 1000 | Pa · s | 101 | 88 | 82 | 77 |
| eta 1500 | Pa · s | 88 | 76 | 72 | 68 |
| eta 5000 | Pa · s | 55 | 49 | 47 | 45 |
| melt viscosity at 360° C. | | | | | |
| eta 50 | Pa · s | 260 | 198 | 171 | 167 |
| eta 100 | Pa · s | 180 | 151 | 132 | 129 |
| eta 200 | Pa · s | 141 | 113 | 101 | 98 |
| eta 500 | Pa · s | 105 | 80 | 70 | 69 |
| eta 1000 | Pa · s | 84 | 62 | 56 | 54 |
| eta 1500 | Pa · s | 70 | 54 | 49 | 47 |
| eta 5000 | Pa · s | 42 | 36 | 33 | 32 |
| MVR | ml/10 min | 0.7 | 1.1 | 1.2 | 1.4 |
| IMVM20' | ml/10 min | 0.7 | 1.1 | 1.0 | 1.1 |
| delta MVR/IMVR20' | | 0.0 | 0 | −0.2 | −0.3 |

Table 2 shows that even small amounts of diglycerol ester have a visible impact on the melt volume flow rate MVR of graphite-containing polycarbonate compositions. Since the graphite contents of compositions B4 to B6 are relatively high, the melt volume flow rates are still relatively low. The melt viscosities measured at various measuring temperatures at different shear rates improve with increasing amount of diglycerol ester.

TABLE 3

| formulation |  | C3 | B7 | B8 | B9 | C4 | B10 | B11 | B12 |
|---|---|---|---|---|---|---|---|---|---|
| A-1 | wt % | 63.00 | 63.00 | 63.00 | 63.00 | 58.00 | 58.00 | 58.00 | 58.00 |
| A-2 | wt % | 7.00 | 6.20 | 5.50 | 5.20 | 7.00 | 6.20 | 5.50 | 5.20 |
| B-1 | wt % | 30.00 | 30.00 | 30.00 | 30.00 | 35.00 | 35.00 | 35.00 | 35.00 |
| C | wt % | — | 0.80 | 1.50 | 1.80 | — | 0.80 | 1.50 | 1.80 |
| $T_g$ | ° C. | 143.9 | 137.7 | 132.3 | 129.5 | 144.4 | 139.3 | 131.3 | 130.0 |
| melt viscosity at 320° C. | | | | | | | | | |
| eta 50 | Pa · s | 1404 | 912 | 575 | 339 | 1622 | 758 | 562 | 589 |
| eta 100 | Pa · s | 1000 | 603 | 407 | 316 | 851 | 479 | 400 | 447 |
| eta 200 | Pa · s | 667 | 376 | 251 | 267 | 565 | 324 | 270 | 316 |
| eta 500 | Pa · s | 358 | 218 | 150 | 178 | 339 | 222 | 182 | 195 |
| eta 1000 | Pa · s | 225 | 155 | 83 | 120 | 249 | 151 | 123 | 126 |
| eta 1500 | Pa · s | 175 | 117 | 64 | 98 | 198 | 124 | 101 | 96 |
| eta 5000 | Pa · s | 96 | 68 |  | 52 | 111 | 72 | 59 | 52 |
| melt viscosity at 340° C. | | | | | | | | | |
| eta 50 | Pa · s | 912 | 776 | 351 |  | 646 | 491 | 302 | 417 |
| eta 100 | Pa · s | 652 | 468 | 214 |  | 428 | 316 | 229 | 275 |
| eta 200 | Pa · s | 438 | 282 | 148 |  | 324 | 200 | 168 | 170 |
| eta 500 | Pa · s | 248 | 159 | 83 |  | 202 | 126 | 112 | 87 |
| eta 1000 | Pa · s | 165 | 102 | 61 |  | 155 | 85 | 81 | 50 |
| eta 1500 | Pa · s | 126 | 74 | 46 |  | 131 | 72 | 68 | 37 |
| eta 5000 | Pa · s | 69 | 40 |  |  | 80 | 43 | 34 |  |
| melt viscosity at 360° C. | | | | | | | | | |
| eta 50 | Pa · s | 597 | 463 |  |  | 380 | 339 | 204 | 309 |
| eta 100 | Pa · s | 442 | 246 |  |  | 282 | 219 | 151 | 195 |
| eta 200 | Pa · s | 305 | 130 |  |  | 224 | 141 | 112 | 117 |
| eta 500 | Pa · s | 169 | 60 |  |  | 173 | 87 |  | 63 |
| eta 1000 | Pa · s | 114 | 36 |  |  | 126 | 65 |  |  |
| eta 1500 | Pa · s | 93 | 30 |  |  | 107 | 51 |  |  |
| eta 5000 | Pa · s | 50 | 15 |  |  | 59 | 31 |  |  |

Table 3 shows that diglycerol esters have a marked impact on the melt viscosities of graphite-containing polycarbonate compositions.

Examples B7 to B9 and B10 to B12 show markedly reduced melt viscosities compared to C3/C4, even at a higher graphite content, Blank fields denote that the compositions had such a high flowability that the melt viscosity could no longer be determined.

The glass transition temperatures ($T_g$) remain within a high range ($T_g>125°$ C.).

TABLE 4

| formulation | | C5 | B13 | B14 | C6 | B15 | B16 |
|---|---|---|---|---|---|---|---|
| A-1 | wt % | 68.00 | 68.00 | 68.00 | 58.00 | 58.00 | 58.00 |
| A-2 | wt % | 6.99 | 6.19 | 5.49 | 6.99 | 6.19 | 5.49 |
| B-2 | wt % | 25.00 | 25.00 | 25.00 | 35.00 | 35.00 | 35.00 |
| C | wt % | — | 0.80 | 1.50 | — | 0.80 | 1.50 |
| D | wt % | 0.01 | 0.01 | 0.01 | 0.01 | 0.01 | 0.01 |
| $T_g$ | ° C. | 144.8 | 138.0 | 131.7 | 145.1 | 138.1 | 130.5 |
| melt viscosity at 320° C. | | | | | | | |
| eta 50 | Pa · s | 533 | 435 | 182 | 702 | 435 | 253 |
| eta 100 | Pa · s | 393 | 274 | 140 | 562 | 323 | 181 |
| eta 200 | Pa · s | 305 | 207 | 109 | 432 | 235 | 137 |
| eta 500 | Pa · s | 220 | 140 | 80 | 319 | 159 | 93 |
| eta 1000 | Pa · s | 171 | 105 | 63 | 253 | 123 | 74 |
| eta 1500 | Pa · s | 146 | 92 | 55 | 218 | 109 | 62 |
| eta 5000 | Pa · s | 86 | 58 | 37 | 116 | 68 | 37 |
| melt viscosity at 340° C. | | | | | | | |
| eta 50 | Pa · s | 393 | 253 | 120 | 674 | 302 | 240 |
| eta 100 | Pa · s | 302 | 175 | 85 | 512 | 224 | 154 |
| eta 200 | Pa · s | 232 | 126 | 67 | 379 | 174 | 98 |
| eta 500 | Pa · s | 164 | 86 | 46 | 253 | 117 | 60 |
| eta 1000 | Pa · s | 124 | 65 | 36 | 190 | 84 | 44 |
| eta 1500 | Pa · s | 109 | 55 | 32 | 159 | 73 | 40 |
| eta 5000 | Pa · s | 66 | 38 | 21 | 90 | 47 | 25 |
| melt viscosity at 360° C. | | | | | | | |
| eta 50 | Pa · s | 351 | 219 | 101 | 491 | 245 | 230 |
| eta 100 | Pa · s | 239 | 147 | 76 | 358 | 186 | 129 |
| eta 200 | Pa · s | 175 | 98 | 56 | 274 | 144 | 81 |
| eta 500 | Pa · s | 122 | 66 | 37 | 187 | 98 | 52 |
| eta 1000 | Pa · s | 94 | 51 | 26 | 145 | 74 | 37 |
| eta 1500 | Pa · s | 80 | 42 | 22 | 122 | 60 | 32 |
| eta 5000 | Pa · s | 49 | 27 | 14 | 71 | 37 | 20 |

Table 4 shows that diglycerol esters have a marked impact on the melt viscosities of graphite-containing polycarbonate compositions.

B15, B16, B17 and B18 show markedly reduced melt viscosities compared to C5/C6. The glass transition temperatures remain within a high range. ($T_g>125°$ C.).

where $R = COC_nH_{2n+1}$ and/or $R=COR'$, wherein n is an integer and R' is a branched alkyl radical or a branched or unbranched alkenyl radical and $C_nH_{2n+1}$ is an aliphatic, saturated linear alkyl radical.

The invention claimed is:

1. A polycarbonate composition comprising
   A) 20 wt % to 94.8 wt % of an aromatic polycarbonate,
   B) 5 to 40 wt % of graphite and
   C) 0.2 wt % to 3.0 wt % of diglycerol ester.

2. The polycarbonate composition according to claim 1 comprising 0.2 to 1.2 wt % of diglycerol ester.

3. The polycarbonate composition according to claim 1, characterized in that as diglycerol ester an ester of formula (I) is present 4. The polycarbonate composition according to claim 3, characterized in that $R=COC_nH_{2n+1}$ wherein n is an integer from 6-24.

5. The polycarbonate composition according to claim 1, wherein the diglycerol ester is diglycerol monolauryl ester or a mixture of diglycerol monolauryl ester and further diglycerol esters.

6. The polycarbonate composition according to claim 1, wherein the graphite is an expanded graphite or a mixture of an expanded graphite with further graphite.

7. The polycarbonate composition according to claim 1, wherein the composition consists of
   A) 74.0 wt % to 85.0 wt % of aromatic polycarbonate,
   B) 5 to 25 wt % of graphite,
   C) 0.2 to 1.2 wt % of diglycerol ester, D) optionally up to 1.0 wt % of heat stabilizer and/or transesterification stabilizer and/or E) optionally up to 10.0 wt % of one or more further additives selected from the group consisting of flame retardants, anti-dripping agents, antioxidants, inorganic pigments, carbon black, dyes, inorganic fillers, titanium dioxide, silicates, talc, barium sulfate, demolding agents, and combinations thereof.

8. The polycarbonate composition according to claim 1, wherein the composition consists of A) 74.0 wt % to 79.6 wt % of aromatic polycarbonate, B) 20 to 25 wt % of graphite, C) 0.2 to 1.2 wt % of diglycerol ester, D) optionally up to 1.0 wt % of heat stabilizer and/or transesterification stabilizer and/or E) optionally up to 10.0 wt % of one or more further additives selected from the group consisting of flame retardants, anti-dripping agents, antioxidants, inorganic pigments, carbon black,r dyes, inorganic fillers, titanium dioxide, silicates, talc, barium sulfate, demolding agents, and combinations thereof.

9. Polycarbonate composition according to claim 7, characterized in that the amount of diglycerol ester is from 0.8 to 1.2 wt %.

10. A method comprising adding at least one diglycerol ester to enhance the melt volume flow rate determined as per DIN EN ISO 1133 (DIN EN ISO 1133-1:2012-03) at a test temperature of 300° C. with a mass of 1.2 kg to a thermally conductive polycarbonate composition comprising graphite.

11. The method according to claim 10, characterized in that the melt viscosity, determined as per ISO 11443, of the polycarbonate compositions is reduced by the diglycerol ester.

12. The polycarbonate composition according to claim 3, characterized in that $R=COC_nH_{2n+1}$ wherein n is an integer from 8 to 18.

13. The polycarbonate composition according to claim 3, characterized in that $R=COC_nH_{2n+1}$ wherein n is an integer from 10 to 16.

14. The polycarbonate composition according to claim 3, characterized in that $R=COC_nH_{2n+1}$ wherein n is 12.

* * * * *